United States Patent
Aldrich et al.

(10) Patent No.: US 11,786,043 B2
(45) Date of Patent: Oct. 17, 2023

(54) SLIDABLE BED ARRANGEMENT

(71) Applicants: Lon L. Aldrich, Topeka, IN (US);
Andrea Graves, Kendallville, IN (US);
John Jones, Edwardsburg, MI (US)

(72) Inventors: Lon L. Aldrich, Topeka, IN (US);
Andrea Graves, Kendallville, IN (US);
John Jones, Edwardsburg, MI (US)

( * ) Notice: Subject to any disclaimer, the term of this patent is extended or adjusted under 35 U.S.C. 154(b) by 545 days.

(21) Appl. No.: 16/873,584

(22) Filed: May 13, 2020

(65) Prior Publication Data
US 2021/0353072 A1   Nov. 18, 2021

(51) Int. Cl.
*A47C 19/22* (2006.01)
*B60N 3/00* (2006.01)
*A47B 83/04* (2006.01)

(52) U.S. Cl.
CPC .............. *A47C 19/22* (2013.01); *A47B 83/04* (2013.01); *B60N 3/001* (2013.01); *B60N 3/008* (2013.01)

(58) Field of Classification Search
CPC ......... A47C 17/52; A47C 17/62; A47C 17/80; A47C 19/22; A47B 83/04; B60N 3/001; B60N 3/008; B60P 3/39; B60P 3/32; B62D 33/0612
USPC ........ 5/2.1, 3, 6; 296/190.01, 190.02, 65.01; 108/44; 297/1, 2, 135
See application file for complete search history.

(56) References Cited

U.S. PATENT DOCUMENTS

| | | | | |
|---|---|---|---|---|
| 126,266 A | * | 4/1872 | Coates | A47C 17/62 297/109 |
| 236,289 A | * | 1/1881 | Wooldridge | A47C 17/62 126/214 B |
| 1,282,596 A | * | 10/1918 | Kroehler | A47C 17/62 5/55.1 |
| 2,605,480 A | * | 8/1952 | Miesner | A47C 17/48 5/160 |

(Continued)

FOREIGN PATENT DOCUMENTS

KR     20220008566 A  *  1/2022

*Primary Examiner* — Jose V Chen
(74) *Attorney, Agent, or Firm* — Ryan M. Fountain (57) ABSTRACT

A bed arrangement is provided wherein the mattress is supported on a laterally slidable platform which is movable along guide tracks mounted to a support surface, between positions where the mattress overlays a side table and exposes more accessible floor space on the opposing side of the bed, to positions where the mattress does not overlay the side table and exposes floor space on each side of the bed. The support surface can be formed in an RV over a pass-through storage compartment having exterior access. In preferred embodiments, the bedroom of the RV has a side table integrally formed with the support surface on each side of a king-sized bed, and the mattress is slidable from one side wall to the other side wall, over the side tables alternatively, such that extra floor space can be exposed alternatively on both sides of the bed. The support platform can include a fixed interior storage cabinet at the foot of the mattress or an enlarged storage area under the mattress for conventional, removable luggage or storage containers. The (Continued)

bed arrangement for the mattress accommodates are variety of aesthetically pleasing floor plans configurations with a variety of attractive storage cabinets also mountable above the side tables and mattress.

16 Claims, 11 Drawing Sheets

(56) References Cited

U.S. PATENT DOCUMENTS

| | | | | |
|---|---|---|---|---|
| 4,197,600 | A * | 4/1980 | Slabic | B60P 3/38 5/2.1 |
| 5,913,769 | A * | 6/1999 | Byma | A47C 17/52 5/2.1 |
| 6,644,724 | B1 * | 11/2003 | Penaloza | B62D 33/0612 5/118 |
| 6,942,269 | B2 * | 9/2005 | Mains | B60N 3/001 296/37.16 |
| 2009/0102231 | A1 * | 4/2009 | Atcravi | B60P 3/34 296/175 |
| 2010/0102593 | A1 * | 4/2010 | Bisinger | B60N 3/001 296/65.01 |
| 2012/0054959 | A1 * | 3/2012 | Stimel | B60N 2/7011 5/9.1 |
| 2012/0318918 | A1 * | 12/2012 | Johnson | B64D 11/0604 5/2.1 |
| 2014/0047638 | A1 * | 2/2014 | Zimmer | A47C 17/52 5/2.1 |
| 2015/0013572 | A1 * | 1/2015 | Hillman | A47B 1/10 108/44 |
| 2018/0055233 | A1 * | 3/2018 | Frederick | B62D 33/0207 |
| 2019/0366904 | A1 * | 12/2019 | Medina | B60N 3/008 |
| 2020/0337467 | A1 * | 10/2020 | Cannon | B60N 2/34 |
| 2022/0117389 | A1 * | 4/2022 | O'Hara | A47B 5/006 |

* cited by examiner

SLIDABLE BED ARRANGEMENT

BACKGROUND OF THE INVENTION

The present invention relates generally to structural arrangements for supporting beds within sleeping quarters (or bedrooms), and more particularly, to bed supporting arrangements within recreational vehicles ("RVs"), such as travel trailers, toy haulers, fifth wheel trailers, motor homes, and like vehicles having at least living quarters therein (and as otherwise defined by the Recreational Vehicle Industry Association). Additional information about RVs can be found on the internet at www.rvia.org.

RVs are typically versatile vehicles which may be used for concurrently or separately hauling or storing equipment, other vehicles, personal property, people, and animals. RVs are often used for camping and/or recreation, or as temporary living quarters for an extended period of time. As such, the removable contents of an RV can include camping equipment, other vehicles (such as golf carts, ATVs, race cars, dune buggies) and tools therefor, chairs, tables, tents, bar-b-ques, small boats, swimming toys and accessories, ski and snowboard gear, etc.

At the same time, it has been desirable to construct RVs with many of the comforts and conveniences of a conventional residential, fixed home, including full-sized appliances, entertainment systems, full-sized furniture, etc. These residential features are often fixedly mounted or positioned within the RV. Accordingly, certain floor plans for RVs can need to be designed around (or at least substantially revised to accommodate) the spacial requirements of these features, as well as the necessary plumbing and/or electrical connections.

However, RVs are typically limited in size, both as a matter of purchaser economics, drivability or towability limitations, fuel economy, and because of various governmental usage regulations. Thus, there are limited possibilities for increased storage space or optimized floor plans when constructing an RV. As a result, in certain prior RVs it has been difficult or impossible to comfortably fit certain full-sized products and features, such as king-sized beds, and still allow those features to be used in the same way they are in fixed, residential homes. For example, while a king-sized bed may literally fit within the permissible side wall dimensions of a travel trailer, prior RV floor plans may not have been able to accommodate accessory side tables and/or provide sufficient walk-around space at the sides of that bed for users to enter and exit that bed and/or conveniently dress and undress adjacent to the bed. Also, the presence of a king-sized bed in certain prior RVs, would severely limit the available interior storage area within the RV bedroom.

Further, it has been found desirable to store certain items used in connection with an RV in separate compartments, and not all stored items are desirable to store within the living quarters of an RV. Accordingly, it has been found desirable to create various storage compartments which are accessible from the exterior of the RV, rather than from its interior living quarters. In order to increase the utility of these exterior storage compartments, it has been found to be especially desirable to form these as "pass-through" storage compartments when possible, meaning that there are doors or openings on each lateral side of the RV which are aligned to allow access to the same compartment from opposing lateral sides of the RV. These pass-through compartments typically have a flat floor extending between each lateral opening, so that stored items can be readily slid from one side of the RV to the other, as convenience dictates in a given situation. However, exterior access storage compartments, and pass-through compartments in particular, can have a significant impact on the amount of space available for interior living spaces and can preclude certain otherwise desirable floor plan formats, particularly where the overall height of the RV is limited.

On occasion, construction and features found in static structures, such as residential buildings, have been incorporated within RVs. Indeed, some of the cosmetic and interior convenience features, as well as the general appeal of an RV, suggest that it is a "home away from home." However, vehicular applications of general building techniques are often difficult or inappropriate, particularly for RVs. In general, RV's and their structural features need to be not merely robust enough to travel at hurricane or tornado-like speeds over highways, but also to endure the differential vertical forces applied over a significant vehicle length for substantial off-road movement to and from camping areas. In addition, when constructing a vehicle, serious consideration must be given to keeping overall weight to a minimum, in order to improve fuel economy.

Other RV design considerations arise in connection with the range of users contemplated for a particular RV. In general, it is desirable to design a particular RV floor plan to be suitable and attractive for a wide range of users, so as to keep production costs lower. It is also desirable to make a particular RV floor plan accessible for given users over a greater range of time, so as to make the amortized purchasing costs lower for users. Thus, consideration should be given to the variations in user profiles over time when laying out a given floor plan. For example, even a young and agile user may not always easily access a product feature in a confined space, but certainly over time that user's agility may temporarily change, as by injury or otherwise. This can be an important consideration not just when laying out storage compartment locations, but also when establishing bedroom arrangement features.

OBJECTIVES OF THE INVENTION

Accordingly, a primary objective of the invention is to provide improved bed arrangements for those sleeping quarters which have significant spacial constraints. These improvements include providing such arrangements which:
a. are inexpensive to manufacture, install, maintain, and repair,
b. increase floor plan optimization when used in a vehicle, such as an RV,
c. minimize component weight,
d. increase storage area and accessibility thereto,
e. increase supplemental feature accessibility and user comfort,
f. balance the conflicting requirements of home, storage, and recreational functions of the applicable vehicle,
g. facilitate use of king-sized and other large beds of a conventional construction, and.
h. increase the aesthetic appeal of RVs.

SUMMARY OF THE INVENTION

These and other objectives of the present invention are achieved by the provision of a bed arrangement wherein the mattress is supported on a laterally slidable platform which is movable along guide tracks mounted to a support surface, between positions where the mattress overlays a side table and exposes more accessible floor space on the opposing side of the bed, to positions where the mattress does not overlay the side table and exposes floor space on each side of the bed. The support surface can be formed in an RV over a pass-through storage compartment having exterior access. In preferred embodiments, the bedroom of the RV has a side table integrally formed with the support surface on each side of a king-sized bed, and the mattress is slidable from one side wall to the other side wall, over the side tables alternatively, such that extra floor space can be exposed alternatively on both sides of the bed. The support platform can include a fixed interior storage cabinet at the foot of the mattress or an enlarged storage area under the mattress for conventional, removable luggage or storage containers. The bed arrangement for the mattress accommodates are variety of aesthetically pleasing floor plan configurations, with a variety of attractive storage cabinets also mountable above the side tables and mattress.

Other objects, advantages, and novel features of the present invention will become readily apparent from the following drawings and detailed description of certain preferred and alternative embodiments.

DETAILED DESCRIPTION OF PREFERRED EMBODIMENTS

The figures show schematically, and in best mode versions, embodiments of the present invention, as applied to a travel trailer-type of RV, both generically and specifically. The drawings are not to scale from one view to the next.

The following features are illustrated in the drawings by these numerals:

10. A recreational vehicle ("RV"), such as a towable travel trailer,
12. The front of the RV,
14. The back or rear of the RV,
16. The roof or top of the RV,
18. The interior left wall of the RV,
18a. The interior front wall of the RV,
19. The interior right wall of the RV,
20. The master bedroom or sleeping quarters of the RV,
22. The rearward portions of the RV, such as the kitchen, living room, and/or garage portions of the RV,
24. An interior wall of the RV separating the bedroom from the rest of the RV,
26. A door in wall 26,
28. A pass-through storage compartment accessible from the exterior sides of the RV,
29. An exterior door opening to compartment 28,
30. A mattress, preferably a king-sized mattress, but alternatively any other user desired mattress,
32. The head of the mattress,
34. The foot of the mattress,
38. Pillows,
40. A platform for supporting the mattress, such as may be formed from plywood or other rigid, flat material,
40a. A platform for alternative embodiments where there is no hinged portion of the platform under the foot of the mattress,
42. A support surface, such as may be formed co-extensively with the ceiling of the pass-through storage compartment, extending fully from one side of the bedroom to the other, although in embodiments where a pass-through storage compartment is not used beneath the bed or is not formed with the same relative dimensions as the embodiments in the drawings, one or more projecting ledges, flanges or other elevated surface structure can be used,
44. The floor of the bedroom, which can be integrally formed as part of the support surface and/or formed as a surface lower than an elevated portion of the support surface, for providing structural support for the bed arrangement,
46. A downwardly extending leg, connected to platform 40, adapted to be readily slidable over the floor, in conjunction with another, spaced apart leg,
46a. A downwardly extending single leg or wall leg, connected to platform 40, adapted to be readily slidable over the floor, as an alternative embodiment to leg 46,
48. A guide track, of a convention nature, including, for example, two relatively slidable and interlocked elements, one fixed to platform 40 and the other fixed to support surface 42, adjacent and aligned with wall 19, such that platform 40 is slidable along the track from side to side within bedroom 20.
50. A guide track similar in construction and purpose to track 48, except spaced apart and toward the rear of the RV on support surface 42,
50a. A unitary guide track (as distinguished from the two-part guide track 48) the mounted on floor 44, for use in alternative embodiments, wherein a track component interlock is not used,
50b. An interior edge of wall leg 46a, which is aligned with and closely adjacent to guide track 44 so as to be slidable with respect to guide track 44, 50c. A unitary guide track mounted on support surface 42 spaced apart and aligned with a like unitary guide track, 50d. A unitary guide track mounted on support surface 42 for singular use, 52. Roller bearings, 52a. Roller bearings mounted on the underside of platform 40a, for use in alternative embodiments where close engagement of those roller bearings with tracks 50c and 50d provide sufficient interlock of the platform to the support surface, 54. Hinges joining portions or panels of platform 40, 55. A storage cabinet accessible through a hinged portion of platform 40 and/or side doors, under the foot of the mattress and above floor 44, 56. A drive motor or other actuation device of a conventional nature connected, for example, to at least one of the guide tracks or platform 40, for selectively moving platform 40 relative to support surface 42, according to user actuation.

58. A handle or like manually engagable projection or surface feature to facilitate either side to side motion of platform 40 or lifting of the hinged portion or panel of platform 40 beneath foot 34, 60. A side table or shelf adjacent to mattress 30, located or formed on one or both sides of the mattress, which may be formed co-extensive with a portion of the ceiling of an exterior access storage compartment or formed as a separate element, and may have an opening for access to a storage compartment or interior cabinet, as desired in given embodiments, 60a. A vertical wall separating an elevated portion of support surface 42 from floor 44 in a given embodiment, 61. Top surface of side table 60, which may be integrally formed with support surface 42 or elevationally distinct therefrom, 62. Overhead cabinet, on one or both sides of the mattress and/or spaced over the head of the mattress, L. A direction of movement of the mattress toward the left wall of the RV, R. A direction of movement of the mattress toward the right wall of the RV, D1. The dimension or space between a side of the mattress and the wall of the RV when the mattress is laterally centered within the bedroom, and D2. The dimension or space between a side of the mattress and one side wall of the RV when the opposite side of the mattress abuts the opposite side all of the RV.

In general, the present invention allows a larger mattress (such as a king-sized bed) to be readily moved (either manually or with electrical, pneumatic, or hydraulic assistance) from side to side within the bedroom, so as to expose and render usable more or less floor space on one side of the mattress or the other. This arrangement allows, for example, sufficient floor space for two users of the larger mattress to simultaneously or sequentially enter and exit the mattress on either side of the mattress in space D1, but permits the mattress to be slid laterally when greater floor space (or walk around space) D2 is needed on one side than the other, such as when a given user needs access to items stored under the mattress, or when a given user needs greater room to dress or undress. This invention allows a wide range of cabinets, table accessories, etc. to still be used with a larger mattress, because the bed arrangement slides the mattress over and/or under those features when access to or use of those features is not needed. This invention does not preclude the use of exterior access storage compartments, including conventional pass-through storage compartments, under the bedroom of an RV because the bed arrangement of the present invention incorporates structure and/or dimensions of the exterior storage compartment into the support surface and/or side tables for the mattress.

Figure 8:
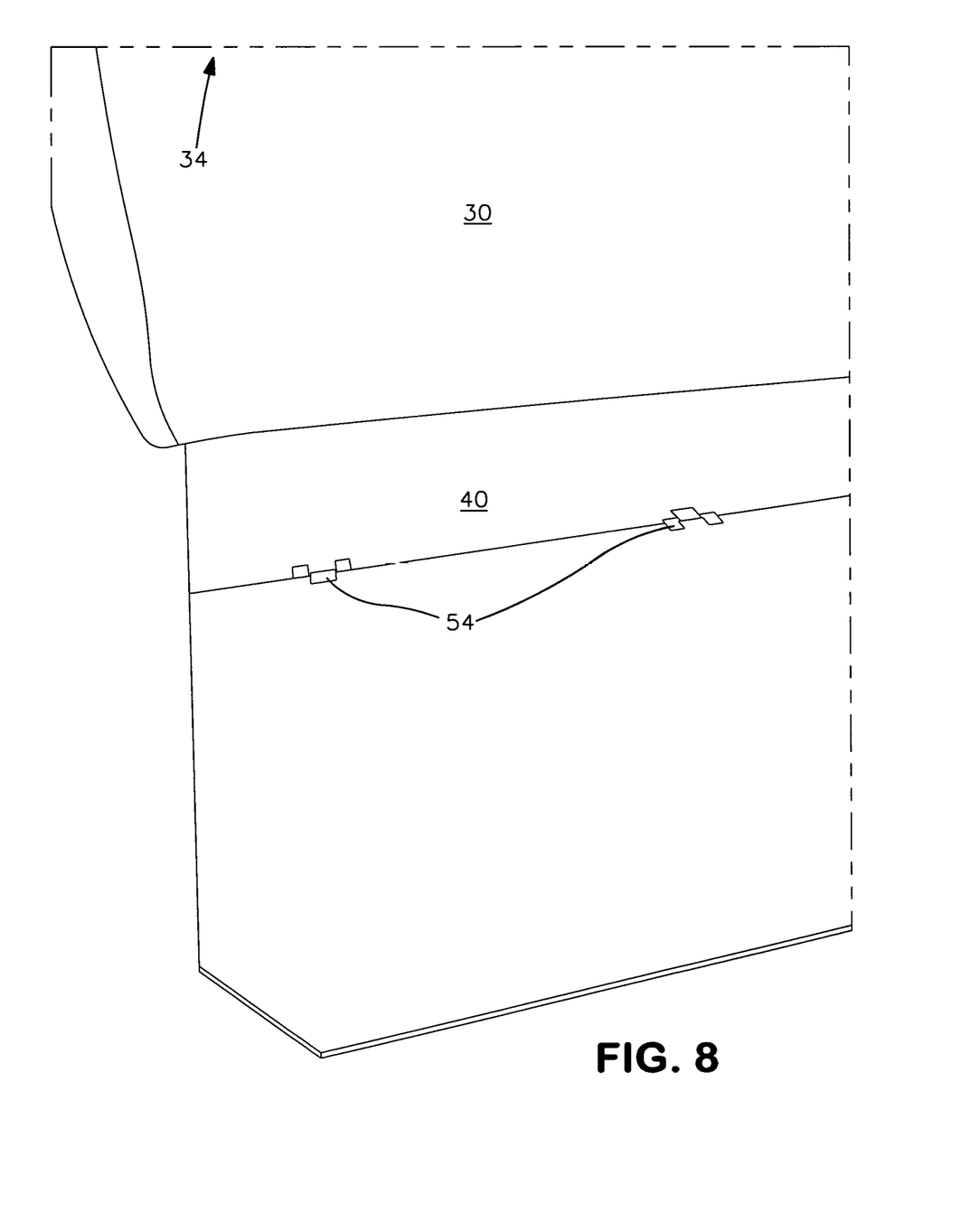
FIG. 8 is an enlarge, partial forward looking, upper perspective view of an embodiment of FIG. 1, showing the mattress elevated to expose the hinged left corner portion of the platform at the foot of the mattress.

In each of the embodiment illustrated, platform 40 has been shown as formed from a plywood material which has sufficient surface adhesion that a conventional mattress will be relatively fixed thereto and not inadvertently slide thereon. In that regard, mattress 30 is considered sufficiently fixed to platform 40 for the usual purposes. However, it should be apparent that mattress 30 can be manually lifted from platform 40 (in whole or part) when desired, such as is shown in FIG. 8 when access to cabinet 55 is desired by lifting the hinged portion of platform 40. As with conventional platforms for supporting a mattress, other structural features can be used to prevent undesired motion of the mattress with respect to the platform, as needed in a given embodiment.

Figure 1:
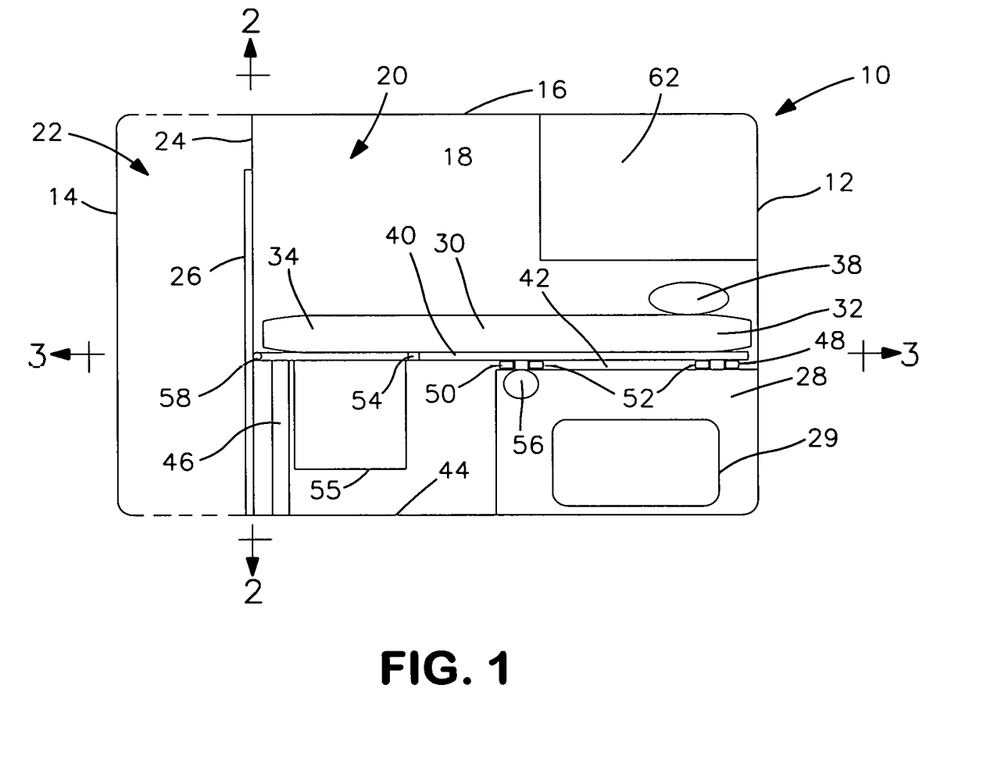
FIG. 1 is a cross-sectional schematic view of an embodiment of the present invention mounted in an RV, as viewed along the longitudinal length of the RV, with the rearward portion of the RV denoted by broken lines.
Figure 2:
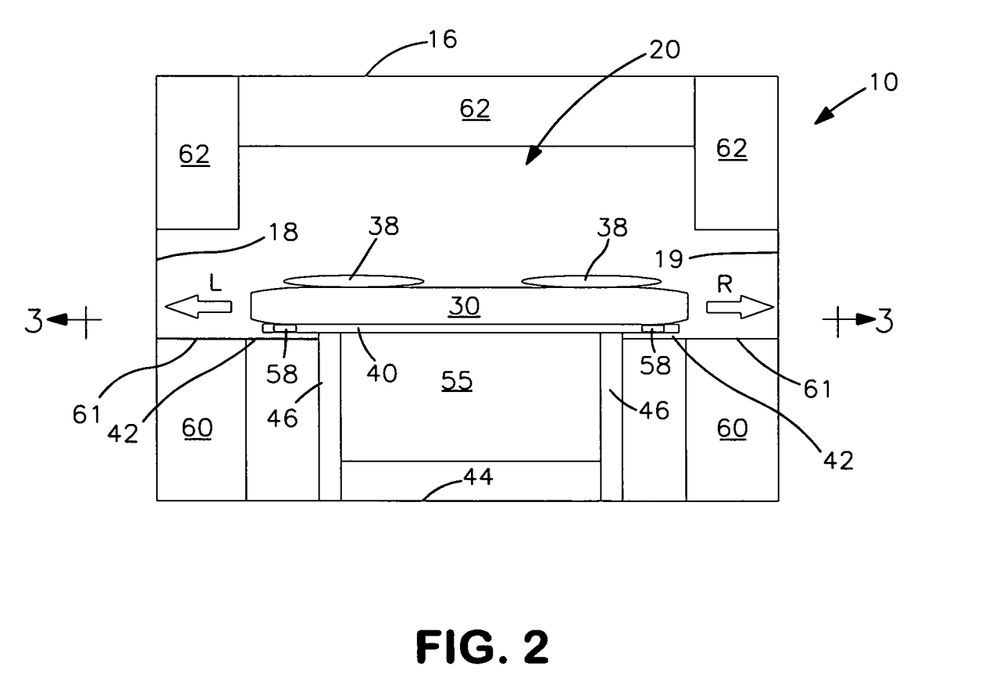
FIG. 2 is a forward looking cross-sectional view of the embodiment of FIG. 1, along line 2-2 and looking toward the front of the RV.
Figure 3:
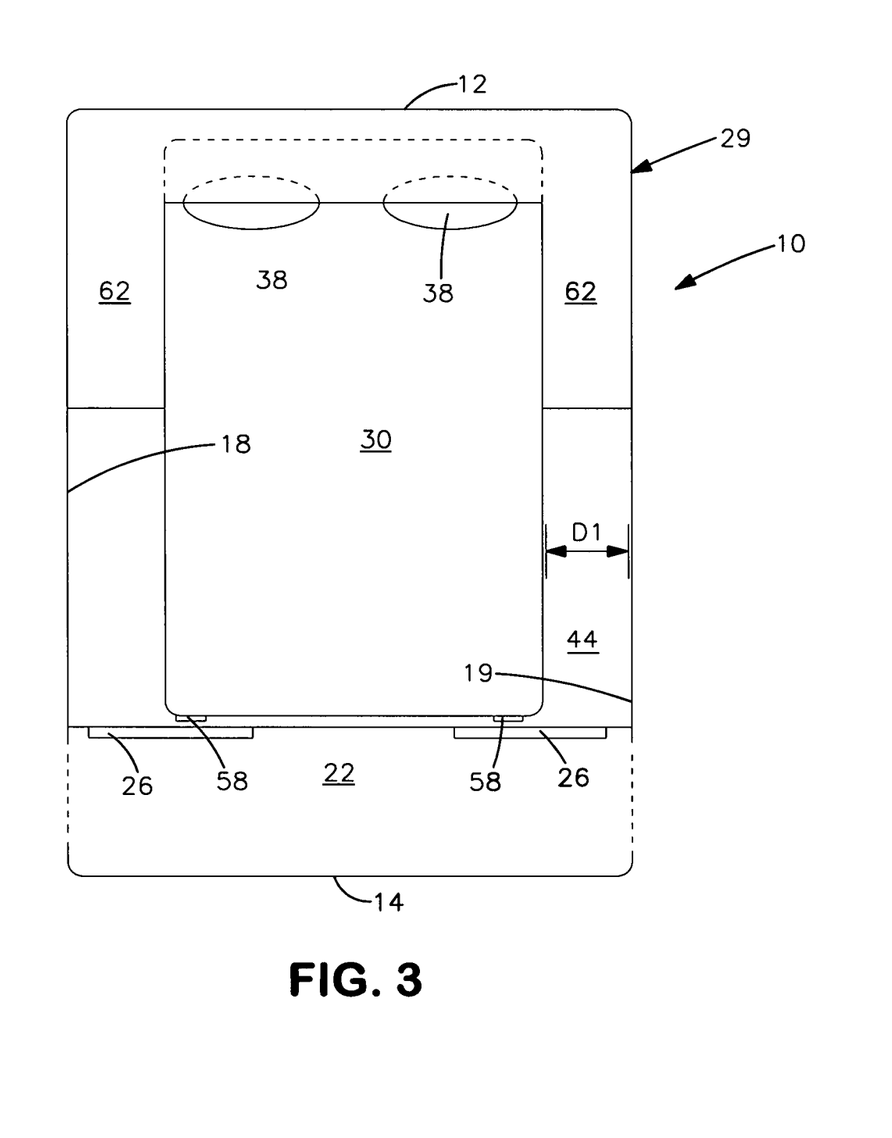
FIG. 3 is a downward looking cross-sectional view of the embodiment of FIG. 1, toward line 3-3 and the floor of the RV with the top of the RV removed, and with the mattress centered between the side walls of the RV.
Figure 4:
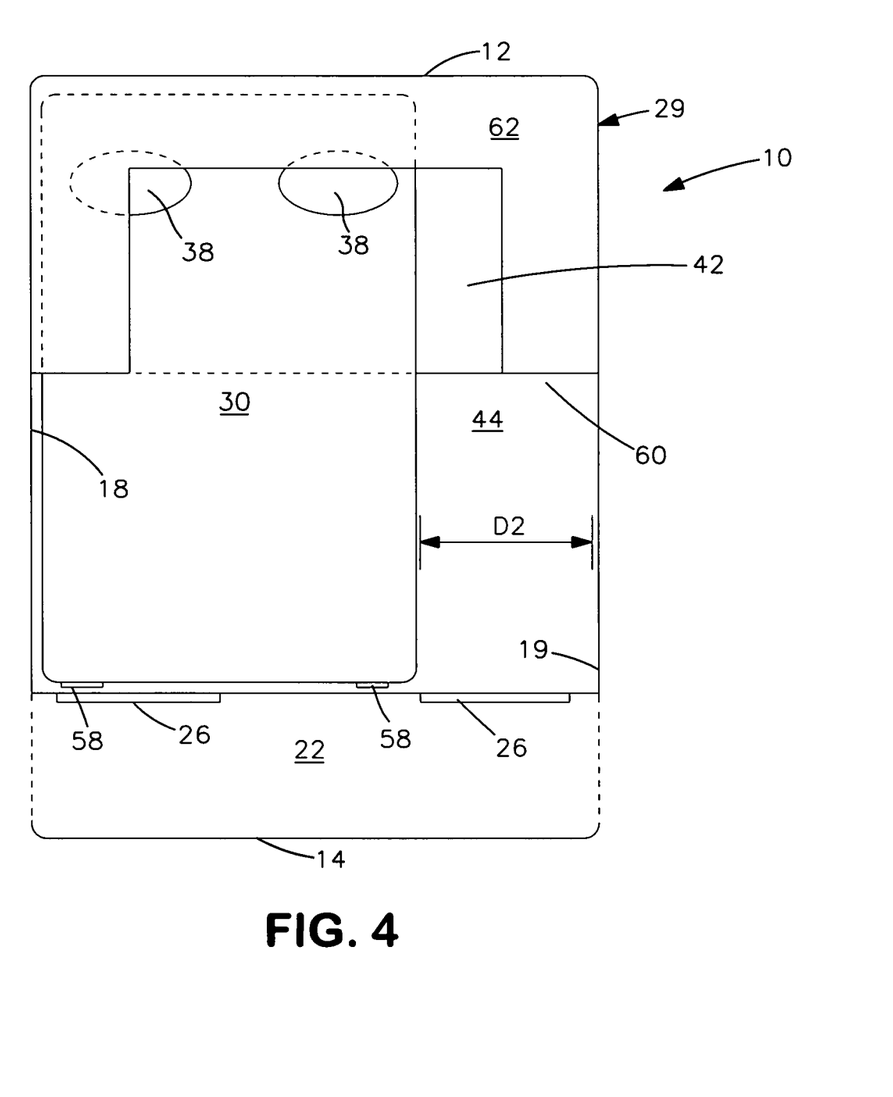
FIG. 4 is the same viewpoint as in FIG. 3 of the embodiment of FIG. 1, with the mattress moved toward the left side wall of the RV.
Figure 5:
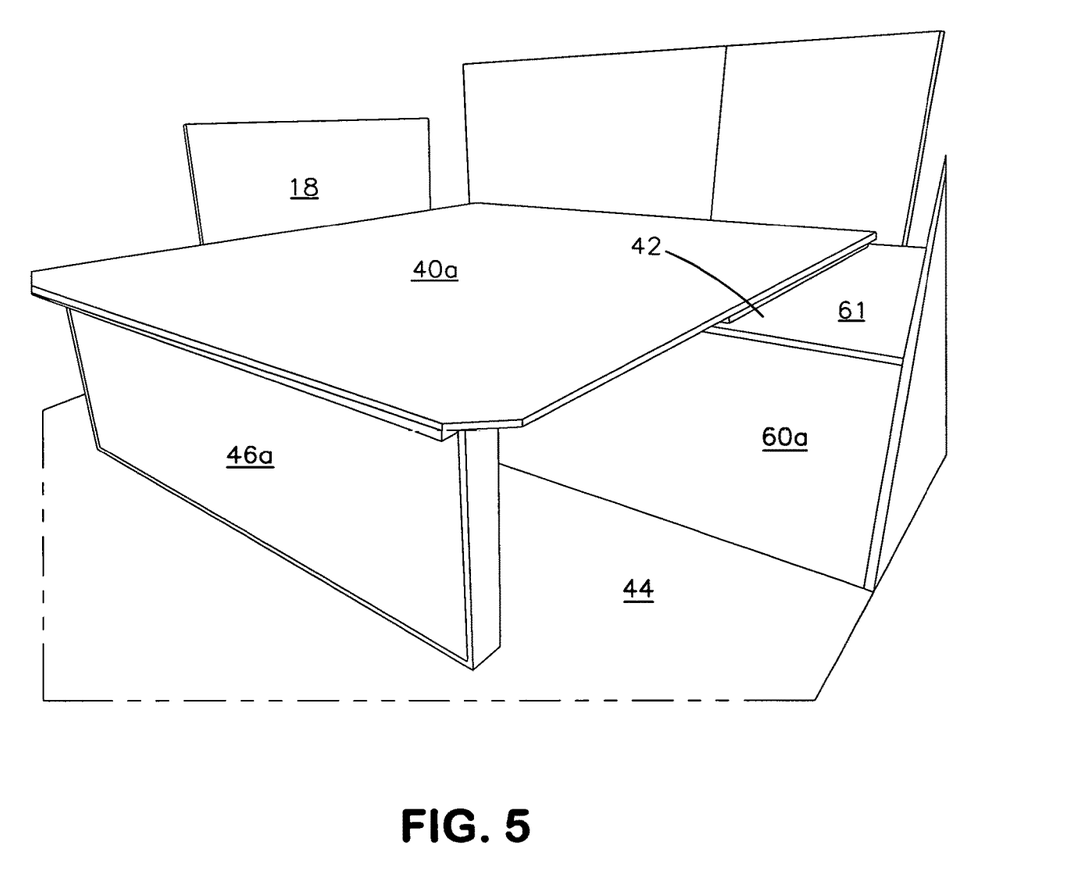
FIG. 5 is a forward looking, right side, upper perspective view of portions of an alternative embodiment of the present invention, illustrating features and orientation of the platform with respect to the support surface, left side wall of the RV, and RV floor.
Figure 6:
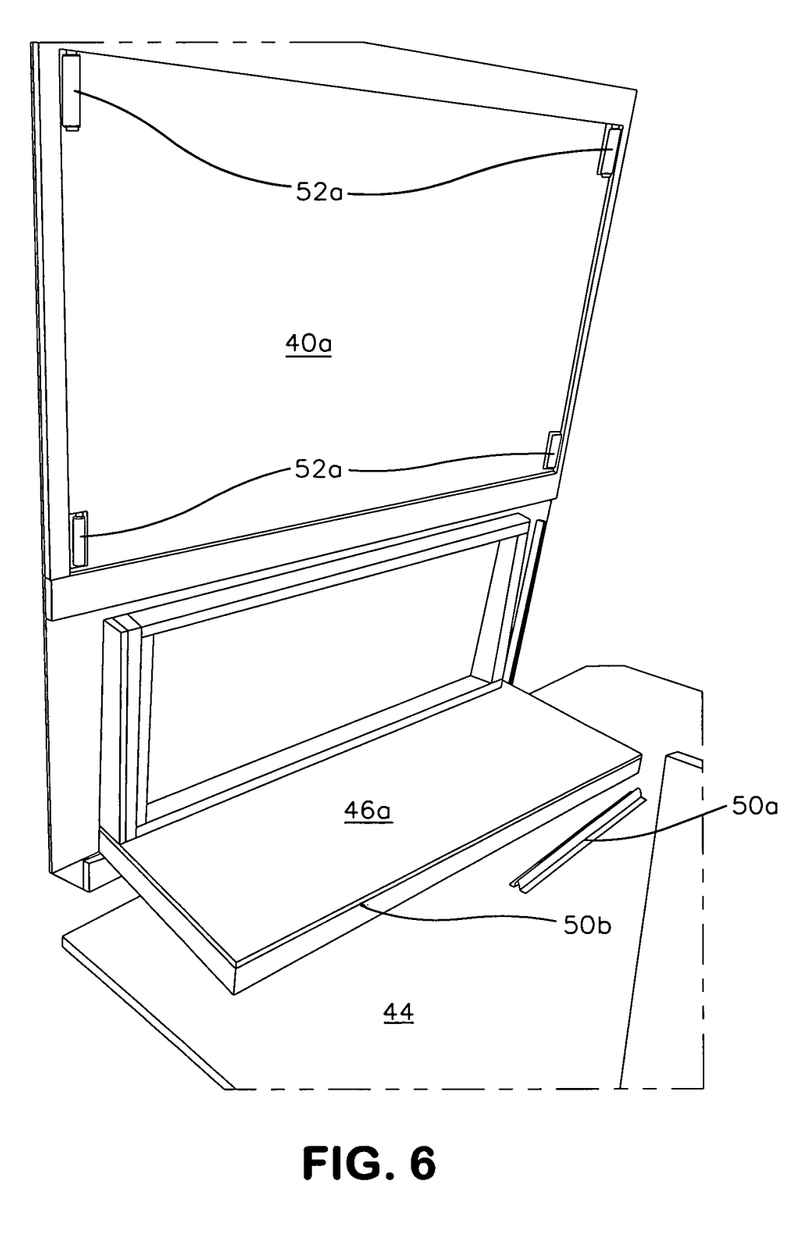
FIG. 6 is a rearward looking right side, upper perspective view of the embodiment of FIG. 5 with the platform rotated rearward approximately 90 degrees and removed from the floor track to expose underside features.
Figure 7:
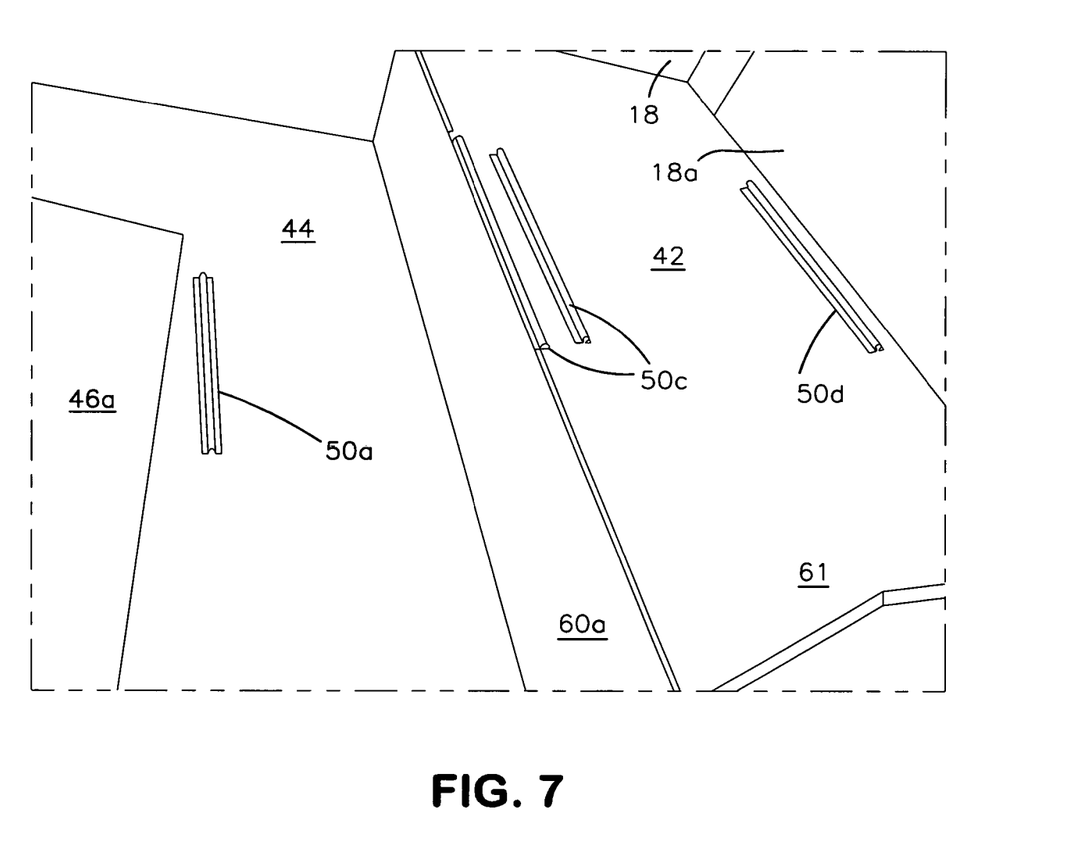
FIG. 7 is a forward looking, right side, upper perspective view of the embodiment of FIG. 5, corresponding to the orientation of elements in FIG. 6, to expose the guide track mounting on the support surface and RV floor.

In the embodiment of FIGS. 5-7, the dimensional intrusion of the exterior access pass-through storage compartment is used to form a support surface 42 which incorporates side table top surfaces 61 on each side of the mattress, along a single horizontal plane. In other embodiments, top surfaces 61 on each side of the mattress may not be connected, such as where the exterior storage compartments have only limited extension across the width of the RV. In such embodiments, guide tracks can also be adapted in location and size as needed, such as by mounting track 48 on front wall 18a or on a vertical post or flange from floor 44, or by using a pair of shorter tracks 48, one mounted on each of the side top surface.

In specific embodiments, the size of cabinet 55 can extend completely forward to fill the space between legs 46 and vertical wall 60a, or alternatively, be limited in size so as to allow use and/or storage of conventional luggage within the space under the mattress. Also, cabinet 55 can be removably mounted to platform 40 and/or be formed as multiple units so as to be more readily removable within space D2. Also, cabinet 55 can be formed with security features to protect valuable items or items needed restricted access (such as firearms) in a hidden orientation under the mattress.

Further, the essential features of the present invention can be formed so as to facilitate retrofitting into previously manufactured living quarters or application as an optional upgrade to a pre-existing floor plan. It is contemplated that often such retrofitting can be accomplished with minimal adaption needed with respect to previously installed cabinets and side tables, since the present invention can often be mounted for sliding over those features. While shown in the figures with respect to side-to-side movement of the mattress within an RV, the present invention is readily adaptable to move a mattress in a longitudinal path (front-to-rear) within an RV as well, if for example, the head of the mattress is preferably positioned against one side of the RV, rather than abutting a front or rear wall of the RV.

Figure 9:
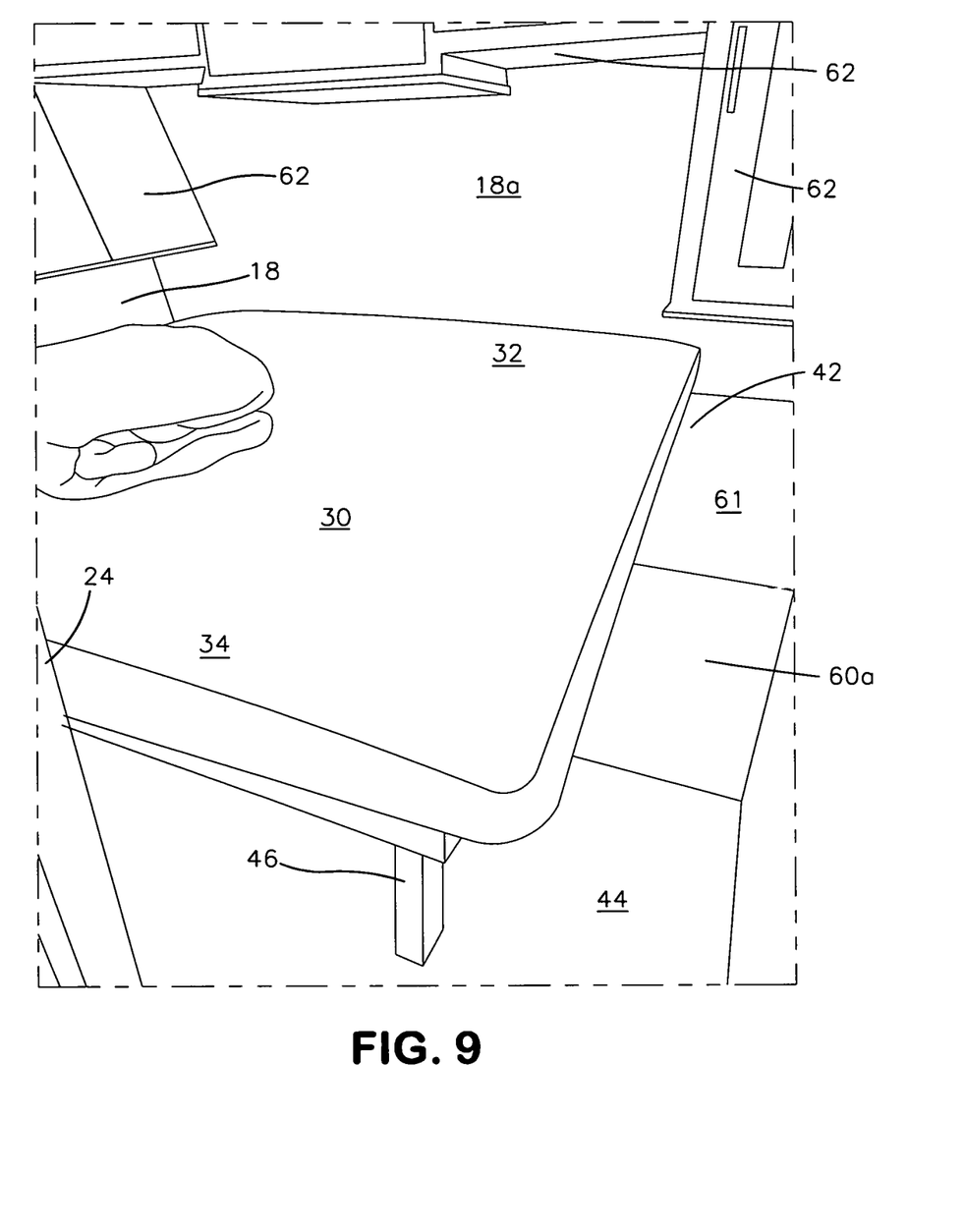
FIG. 9 is a forward looking, right side, upper perspective view of another alternative of the present invention, with the mattress centered between the sides of the RV.
Figure 10:
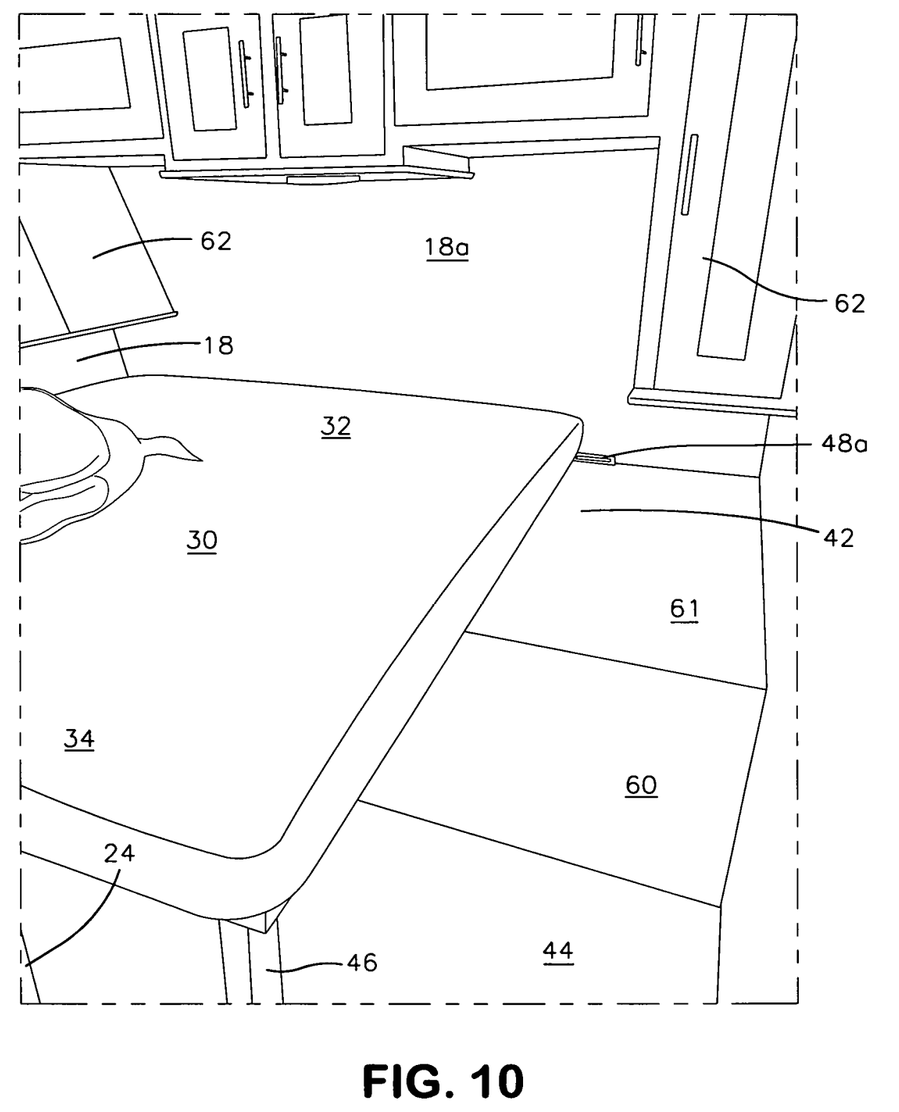
FIG. 10 is the same viewpoint and embodiment as in FIG. 9, with the mattress moved to the left side of the RV.
Figure 11:
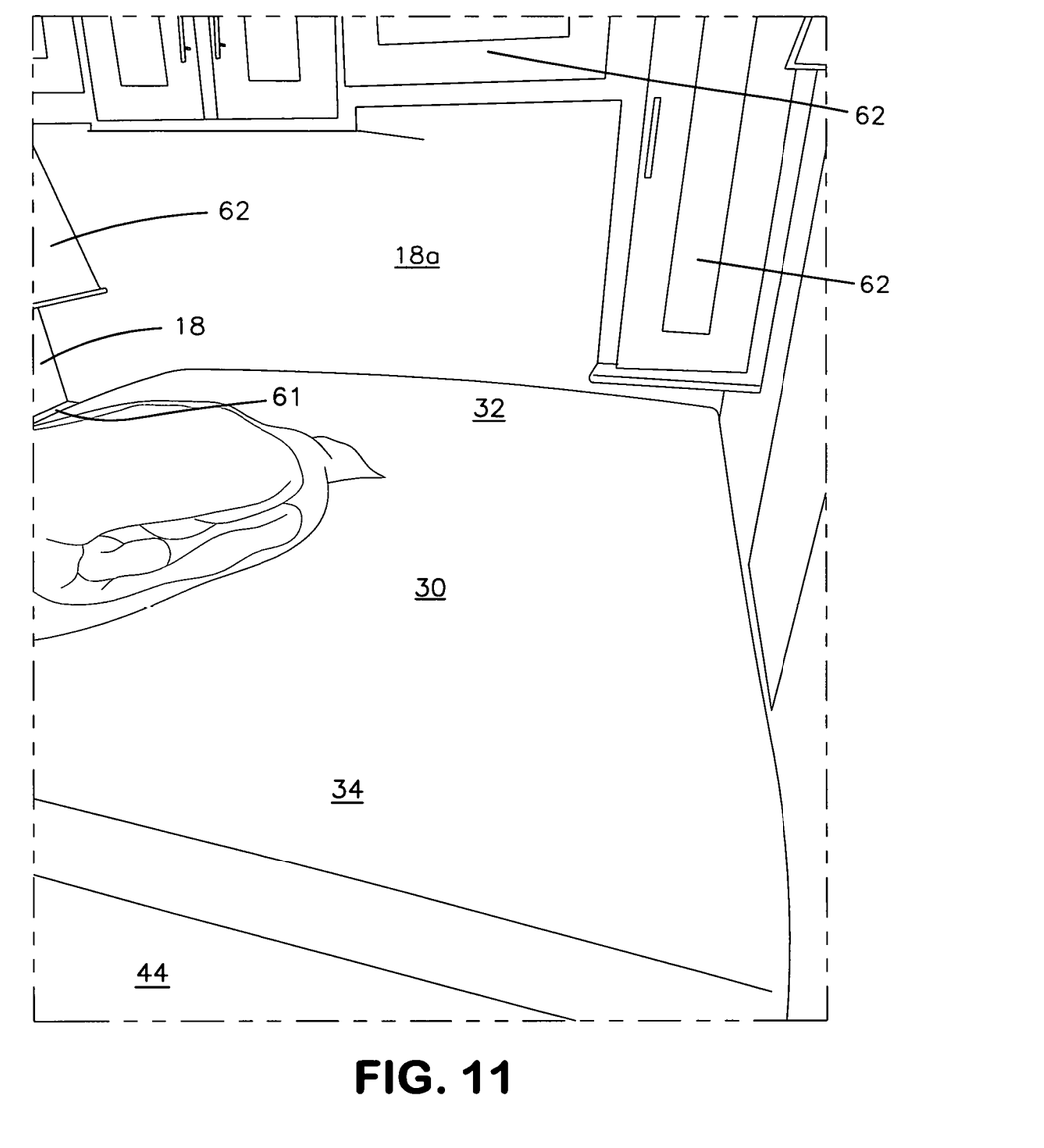
FIG. 11 is the same viewpoint and embodiment as in FIG. 9, with the mattress moved to the right side of the RV.

By comparison, FIGS. 5-7 show a best mode embodiment of the present invention with a wall leg 46a, while FIGS. 9-11 show an alternative best mode embodiment of the present invention with multiple spaced legs 46. In comparison with the embodiments of FIGS. 1-4 and 8, the embodiments of FIGS. 5-7 and 9-11 do not use cabinet 44. The embodiment of FIGS. 9-11 illustrate application of aesthetic features of the present invention in terms of the relative orientation of the mattress, side tables, and overhead cabinets, as well as application of attractive surface ornamentation of non-mattress features to the present invention, including selection of leg configuration.

Although the present invention has been shown and described herein with respect to certain preferred embodiments and alternative configurations, those were by way of illustration and example only. For example, the figures illustrate the bed arrangement located that the front of the vehicle, but that orientation can be readily adapted to bedrooms at the rear of the vehicle. Further, the present invention has been shown and described with respect to recreational vehicle applications, but it will now be readily understood that this invention can be applied to other bed arrangements, such as those in cruising yachts or fix structures having spacial constraints.

Accordingly, the spirit and scope of the present invention is intended to be limited only by the terms of the appended claims.

What is claimed is:

1. A bed arrangement, disposed within a sleeping quarters, comprising:
    a mattress,
    a platform disposed beneath the mattress, for supporting the mattress thereon,
    a support surface disposed beneath the platform, for supporting the platform and permitting sliding motion of the platform thereon,
    a first guide track connecting the platform to the support surface, for controlling the direction of the sliding motion of the platform with respect to the support surface, and
    whereby the mattress is movable from side to side within the sleeping quarters via movement of the platform along the guide track.

2. A bed arrangement, disposed within a sleeping quarters, comprising:
    a mattress,
    a platform disposed beneath the mattress, for supporting the mattress thereon,
    a support surface disposed beneath the platform, for supporting the platform and permitting sliding motion of the platform thereon,
    a first guide track connecting the platform to the support surface, for controlling the direction of the sliding motion of the platform with respect to the support surface,
    whereby the mattress is movable from side to side within the sleeping quarters via movement of the platform along the guide track, and
    wherein the sleeping quarters is located within a vehicle, and the mattress has a head-to-foot longitudinal dimension and a side-to-side lateral dimension, and the longitudinal dimension is aligned with the direction of front to back spacing of the vehicle and the lateral dimension is aligned with the direction of spacing between the sides of the vehicle.

3. The bed arrangement according to claim 1 wherein the mattress is fixedly supported on the platform, restricting sliding motion of the mattress with respect to the platform.

4. The bed arrangement according to claim 1 wherein at least one roller bearing is mounted between the platform and the support surface to facilitate sliding motion between the platform and the support surface.

5. The bed arrangement according to claim 1 wherein the platform includes at least one downwardly extending leg which slidably engages the support surface.

6. The bed arrangement according to claim 1 further including an actuation device to selectively move the platform with respect to the support surface.

7. A bed arrangement, disposed within a sleeping quarters, comprising:
    a mattress,
    a platform disposed beneath the mattress, for supporting the mattress thereon,
    a support surface disposed beneath the platform, for supporting the platform and permitting sliding motion of the platform thereon,
    a first guide track connecting the platform to the support surface, for controlling the direction of the sliding motion of the platform with respect to the support surface, and
    whereby the mattress is movable from side to side within the sleeping quarters via movement of the platform along the guide track,
    wherein at least one roller bearing is mounted between the platform and the support surface to facilitate sliding motion between the platform and the support surface, and
    wherein the support surface includes an elevated portion and a floor portion, the guide track is mounted at least in part on the elevated portion, and the roller bearing is mounted between the platform and the elevated portion.

8. The bed arrangement according to claim 7 wherein a second guide track is mounted at least in part on the elevated portion, spaced apart from the first guide track, and a plurality of roller bearings are mounted between those guide tracks and between the platform and the elevated portion.

9. The bed arrangement according to claim 7 wherein the platform includes at least one downwardly extending leg which slidably engages the floor portion.

10. The bed arrangement according to claim 9 wherein a storage cabinet is attached adjacent to the downwardly extending leg, under the platform and above the floor portion.

11. The bed arrangement according to claim 10 wherein the platform includes a hinged panel which controls access to the storage cabinet.

12. A bed arrangement, disposed within a sleeping quarters, comprising:
    a mattress,
    a platform disposed beneath the mattress, for supporting the mattress thereon,
    a support surface disposed beneath the platform, for supporting the platform and permitting sliding motion of the platform thereon,
    a first guide track connecting the platform to the support surface, for controlling the direction of the sliding motion of the platform with respect to the support surface, and
    whereby the mattress is movable from side to side within the sleeping quarters via movement of the platform along the guide track, wherein:
    the sleeping quarters is formed within a vehicle,
    at least one side table is mounted to the vehicle and adjacent to the bed arrangement, and
    wherein movement of the platform with respect to the support surface permits the mattress to move over the top of the side table.

13. The bed arrangement according to claim 12 wherein:
    at least one elevated cabinet is mounted to the vehicle at a location which is vertically above the mattress, and wherein movement of the platform with respect to the support surface permits the mattress to mover under the elevated cabinet.

14. A bed arrangement, disposed within a sleeping quarters, comprising:
a mattress,
a platform disposed beneath the mattress, for supporting the mattress thereon,
a support surface disposed beneath the platform, for supporting the platform and permitting sliding motion of the platform thereon,
a first guide track connecting the platform to the support surface, for controlling the direction of the sliding motion of the platform with respect to the support surface, and
whereby the mattress is movable from side to side within the sleeping quarters via movement of the platform along the guide track, wherein:
the sleeping quarters is formed within a recreational vehicle,
the mattress is formed with head and foot portions, and lateral sides,
the mattress is aligned with the recreational vehicle such that the head of the mattress is directed toward the front of the recreational vehicle,
the mattress is a king sized bed,
the platform includes a hinged portion for upward mobility, located under the foot portion of the mattress, and
a storage area is disposed under the hinged portion of the platform.

15. The bed arrangement according to claim 14 wherein:
the recreational vehicle includes interior side walls between the front and rear of the recreational vehicle, and
movement of the platform along the guide track permits the mattress to be moved into abutment with either interior side wall of the recreational vehicle.

16. A bed arrangement, disposed within a sleeping quarters, comprising:
a mattress,
a platform disposed beneath the mattress, for supporting the mattress thereon,
a support surface disposed beneath the platform, for supporting the platform and permitting sliding motion of the platform thereon,
a first guide track connecting the platform to the support surface, for controlling the direction of the sliding motion of the platform with respect to the support surface, and
whereby the mattress is movable from side to side within the sleeping quarters via movement of the platform along the guide track, wherein the:
the sleeping quarters is formed within a recreational vehicle, and
support surface is disposed above a pass-through storage compartment having access thereto from the exterior of the recreational vehicle.

* * * * *